US009987550B2

(12) United States Patent

Nordby et al.

(10) Patent No.: US 9,987,550 B2
(45) Date of Patent: *Jun. 5, 2018

(54) LOTTERY TICKETS, SYSTEMS, AND METHODS

(75) Inventors: Reidar Magnus Nordby, Oslo (NO); Finn Harald Andreassen, Oslo (NO); Nikolai Fasting, Oslo (NO)

(73) Assignee: MULTILOT AS (NO)

( * ) Notice: Subject to any disclaimer, the term of this patent is extended or adjusted under 35 U.S.C. 154(b) by 1248 days.

This patent is subject to a terminal disclaimer.

(21) Appl. No.: 13/518,831

(22) PCT Filed: Dec. 22, 2010

(86) PCT No.: PCT/IB2010/003501

§ 371 (c)(1), (2), (4) Date: Sep. 27, 2012

(87) PCT Pub. No.: WO2011/077259

PCT Pub. Date: Jun. 30, 2011

(65) Prior Publication Data

US 2013/0012288 A1 Jan. 10, 2013

Related U.S. Application Data

(60) Provisional application No. 61/302,924, filed on Feb. 9, 2010, provisional application No. 61/289,096, filed on Dec. 22, 2009.

(51) Int. Cl.

| | |
|---|---|
| ***G06F 17/00*** | (2006.01) |
| ***A63F 3/06*** | (2006.01) |
| ***G07F 17/32*** | (2006.01) |
| *A63F 3/08* | (2006.01) |

(52) U.S. Cl.

CPC .......... *A63F 3/0605* (2013.01); *G07F 17/329* (2013.01); *A63F 2003/086* (2013.01); *A63F 2003/088* (2013.01); *G07F 17/32* (2013.01); *G07F 17/3241* (2013.01); *G07F 17/3272* (2013.01)

(58) Field of Classification Search

CPC .... G07F 17/32; G07F 17/329; G07F 17/3241; G07F 17/3272

USPC ............ 463/16, 17, 42; 273/269, 138.1, 139

See application file for complete search history.

(56) References Cited

U.S. PATENT DOCUMENTS

| | | | | |
|---|---|---|---|---|
| 5,227,874 A * | 7/1993 | Von Kohorn | ........... | A63F 13/12 348/E7.024 |
| 6,024,641 A * | 2/2000 | Sarno | ..................... | G07C 15/00 273/138.2 |
| 6,760,476 B2 | 7/2004 | Meder | | |
| 7,035,626 B1 * | 4/2006 | Luciano, Jr. | ............... | 455/414.1 |

(Continued)

FOREIGN PATENT DOCUMENTS

| | | |
|---|---|---|
| GB | 2431260 | 4/2007 |
| WO | 2007027245 | 3/2007 |

*Primary Examiner* — William H McCulloch, Jr.
*Assistant Examiner* — Chase Leichliter
(74) *Attorney, Agent, or Firm* — Pequignot + Myers; Matthew A. Pequignot

(57) ABSTRACT

Unique lottery tickets and/or systems for providing and/or participating in a lottery. In other embodiments, methods of administering and/or participating in a lottery. In at least one embodiment, a lottery integrated with a television or web broadcast, website, or other broadcast or publication.

10 Claims, 3 Drawing Sheets

(56) References Cited

U.S. PATENT DOCUMENTS

| | | | | |
|---|---|---|---|---|
| 2001/0003099 | A1* | 6/2001 | Von Kohorn | H04N 7/0884<br>463/40 |
| 2006/0063589 | A1* | 3/2006 | Chong | 463/29 |
| 2007/0026926 | A1* | 2/2007 | Romanik | A63F 3/0605<br>463/17 |
| 2007/0060285 | A1* | 3/2007 | White | A63F 3/06<br>463/18 |
| 2007/0270205 | A1* | 11/2007 | Al-Ziyoud | G07F 17/32<br>463/18 |
| 2009/0280886 | A1 | 11/2009 | Randhawa | |
| 2010/0197376 | A1* | 8/2010 | Kerr | 463/17 |
| 2010/0325009 | A1* | 12/2010 | Rajan et al. | 705/26 |

* cited by examiner

LOTTERY TICKETS, SYSTEMS, AND METHODS

RELATED APPLICATION DATA

This application claims priority to U.S. Patent Application No. 61/289,096, entitled LOTTERY TICKETS, SYSTEMS, AND METHODS, filed Dec. 22, 2009, as well as to U.S. Patent Application No. 61/302,924, identically titled, filed on Feb. 9, 2010, the entireties of each of such applications being hereby incorporated by reference.

FIELD OF INVENTION

This invention relates to unique lottery tickets and/or systems for providing and/or participating in a lottery. In other embodiments, this invention relates to methods of administering and/or participating in a lottery.

BACKGROUND OF THE INVENTION

Lotteries have existed in various forms throughout the world for hundreds of years. Typical modern lottery formats often involve the selection by a customer or entrant of a predetermined quantity of lottery numbers (e.g., from a range of numbers) such as by writing such numbers down on a paper form which is submitted to a store clerk. Once the lottery ticket is paid for, such numbers are then entered into a machine which prints, on a second piece of paper, a lottery ticket which is issued to the lottery customer. Lottery winners in such conventional lotteries are eventually chosen by a lottery administrator which—via one or more conventional methods—draws or randomly selects winning numbers which an entrant must have selected, and thereby have a paper ticket with numbers matching the winning numbers, to win the lottery prize. If the lottery ticket is lost, the contestant—even if he or she were a winner—would be unable to collect his/her prize. In such lottery types, because the contestant is able to choose whatever numbers he or she desires, multiple winners may result in a given lottery draw (i.e., which necessitates prize sharing). Conversely, because there is no guarantee that the numbers drawn will precisely match any set of numbers chosen by a lottery contestant, a given lottery draw may result in no winner at all.

In a popular second type of lottery format, paper tickets are sold to lottery customers which are a scratch-off type or variety. With such a lottery ticket, often the ticket is predetermined as either a winner or a loser and the customer discovers the "result" of the ticket by scratching or rubbing off an opaque film which conceals whether the ticket is a winning or losing ticket. Because of the simplicity of their design and implementation, there are often a large variety of scratch-off lottery ticket types which compete with one another.

As most conventional lottery types employ paper tickets, not only does the printing of massive numbers of throw away tickets have an environmental impact, but it also requires substantial financial expenditure by the lottery provider to design, print, store, and ship the tickets to large numbers of geographic locations.

Moreover, despite certain benefits of lotteries such as when portions of profits are used to fund local governments or charities, there are certain social stigmas associated with lotteries because of their possible impact among those susceptible to gambling addiction, for example. Further, often those people in the least wealthy social classes are the persons purchasing the most lottery tickets.

Finally, there has been a decline in the popularity of lotteries in recent years (at least in certain markets and countries) possibly due to lack of excitement or enthusiasm associated with conventional lottery types. In this regard, the public has arguably become sensitized to the conventional lottery formats and therefore does not participate in lotteries in historically high numbers.

Recognizing the above-described drawbacks of conventional lottery types, certain needs in the lottery arts have been identified by the inventor of the application for patent contained herein. For example, there is a need in the lottery arts for new lottery types which elicit greater participation by lottery contestants. As other examples, there is a need for lottery types with reduced environmental impact and/or which are less expensive and cumbersome to administer. Furthermore, there is a need for lottery types which permit or allow the monitoring of individual ticket purchase (or other lottery participation) habits as well as entrant demographics (e.g., to permit or at least aid in government regulation or legal compliance of lotteries). As a final but non-limiting example, there is a need for lotteries which can be administered quickly and without requiring significant advance preparation or planning.

In view of the above-enumerated drawbacks and/or needs or desires for improvements in the arts, it is a purpose of the herein described invention to address one or more of such drawbacks and/or desires as well as, or in the alternative, other needs which will become more apparent to the skilled artisan once given the present disclosure.

SUMMARY OF CERTAIN EMBODIMENTS OF THE INVENTION

Generally speaking, certain embodiments of this invention relate to unique lottery tickets and/or systems for providing and/or participating in a lottery. In other embodiments of this invention, methods of administering and/or participating in a lottery are provided.

In one non-limiting embodiment of the invention, a unique lottery ticket is provided which is comprised of a digital image (or video images or video sequences or footage) submitted by a lottery contestant in association with payment for participation in the lottery. Such digital image (or images) may preferably be combined with contestant related data, such as a contestant name, address, phone number, and/or payment information and encrypted and/or compiled and/or combined as an information capsule which serves as a digital lottery ticket (noting, of course, that neither the creation of an information capsule or the encryption step are required in any particular embodiment). The term "digital image" (whether used in the singular or plural) is hereby defined, for the purposes of construing the entirety of this application, as broadly including still images as well as moving images, sequences of images, video images, and/or video footage. Although an encryption step (or other data/information securitization step) is employed in certain embodiments in which an information capsule is created to serve as a lottery ticket, it is recognized that not all embodiments of the invention will employ such a step or steps i.e., just as with the optional creation of the information capsule, an encryption step is not required in any embodiment although it may be used in any embodiment. Moreover, in embodiments which do employ such a step or steps, the encryption may or may not take place simultaneous with the creation of the information capsule e.g., it may also take place before or after the information capsule is created (if an information capsule is created at all, in a particular embodiment). In certain non-limiting embodiments, however, the encryption step or steps simultaneously create the lottery ticket (e.g., as an information capsule) to be used in the lottery and provide security to the data or information encrypted.

In another non-limiting embodiment, a lottery method is provided comprising the steps of:

a lottery contestant electronically submitting a digital image and payment for lottery participation;

electronically encrypting said digital image and contestant information to form an information capsule comprising a lottery ticket;

entering said lottery ticket into a batch of a plurality of other lottery tickets comprised of information capsules;

selecting a lottery ticket from said batch of a plurality of lottery tickets and designating such lottery ticket as a winning ticket of said lottery;

decrypting said information capsule comprising said winning lottery ticket and obtaining information about the lottery contestant which submitted said winning ticket from said decrypted information capsule.

In the same or in different embodiments, prior to the step of selecting and designating a winning ticket, an additional step (or steps) is performed comprising selecting a subset number of said plurality of lottery tickets which is less than the total number of said plurality of lottery tickets and designating said subset number of selected lottery tickets as winners of an intermediate stage of said lottery.

In an alternative and non-limiting, example embodiment, a lottery system for administering a lottery is provided comprising the steps of:

a) a lottery contestant electronically submitting a digital image and payment for lottery participation;
b) electronically encrypting said digital image and contestant information to form an information capsule comprising an lottery ticket;
c) generating a random entry number and affiliating said random entry number with said lottery ticket;
d) repeating steps a), b), and c) such that a plurality of lottery tickets are formed and a plurality of random entry numbers are generated and affiliated with said plurality of lottery tickets;
e) randomly selecting a random winner number in a winner selection phase and matching said random winner number with one of said plurality of random entry numbers to thereby determine a winning ticket of said lottery; and
f) decrypting said information capsule comprising said winning lottery ticket and obtaining information about the lottery contestant which submitted said winning ticket from said decrypted information capsule.

In the same, similar, or in alternative embodiments of that embodiment described immediately above, prior to step e), additional steps are performed comprising: randomly selecting a plurality of random advancement numbers in a lottery advancement phase, said plurality of random advancement numbers being of a quantity which is less than the total number of said plurality of lottery tickets; and matching said plurality of random advancement numbers with corresponding numbers among said plurality of random entry numbers to thereby determine a subset identity of lottery tickets as winners of an intermediate, advancement stage of said lottery.

In another non-limiting, example embodiment, a lottery system for administering a lottery is provided comprising the steps of:

a) a lottery contestant generating or creating a digital image for use as a lottery ticket;
b) generating an entry number and affiliating the entry number with the lottery ticket;
c) repeating steps a) and b) such that a plurality of lottery tickets are formed and a plurality of entry numbers are generated and affiliated with the plurality of lottery tickets; and
d) randomly selecting a winning ticket number in a winner selection phase and matching the winning ticket number with one of the plurality of entry numbers to thereby determine a winning ticket of the lottery.

In certain embodiments of the invention, a lottery contestant performs the encryption step to form an information (or data) capsule comprising a lottery ticket (e.g., or performs an information capsule generation step at a different time of or even without the use of an encryption step). In such embodiments, the lottery contestant might use a computer or a mobile electronic device such as a mobile phone to complete such encryption step (or information capsule formation step, alone or together with an encryption step). For example, a software application may be provided for computing devices or mobile phones which can be used by contestants to perform the encryption and/or information capsule formation step(s). Such software may be offered as a download or shipped pre-installed on certain devices, for example. In other embodiments, however, the encryption and/or information capsule formation step(s) are performed by lottery servers, lottery equipment, lottery agents or administrators (e.g., or other third parties), such as after receipt of a digital image, payment, and/or contestant information from a lottery contestant, for example.

In yet additional example embodiments of the subject invention, combined with one or more of the embodiments described above or elsewhere herein, one or more versions of the herein described lotteries and/or methods are integrated into or with one or more of the group consisting of: a television show, web broadcast, website, mobile device broadcast, or software generated graphical user interface.

In still further alternative embodiments at an intermediate stage, images of intermediate stage winners are displayed on a television show, web broadcast, website, mobile device broadcast, or software generated graphical user interface. In such or other embodiments, when a final, single winning ticket is selected, the image submitted by the winning contestant is displayed or broadcast on a television show, web broadcast, website, mobile device broadcast, or software generated graphical user interface.

In still additional embodiments, moderators are used to manually review digital images submitted for processing as lottery tickets and to approve or disapprove images for broadcast or publication. In certain non-limiting embodiments, during moderation steps or when moderators are otherwise being used, if a digital image is disapproved, an alternate image is substituted for the disapproved image and is assigned to the lottery ticket associated with said disapproved image, and said alternate image is utilized for broadcast or publication.

In at least one example embodiment, a lottery system is provided in which a number is generated in association with each electronic lottery ticket entered into a batch of a plurality of lottery tickets and is logged, and the number is used in performing intermediate stage winner selection or final winner selection steps. In a similar or alternative embodiment, intermediate stage winner selection or final winner selection steps are performed utilizing a random number generator to randomly generate numbers which are matched to logged numbers, generated in association with lottery tickets being entered into said batch, to thereby select intermediate stage winners and/or a final lottery winner.

In at least one non-limiting embodiment, images submitted to be processed as and/or converted into lottery tickets are taken and/or submitted using a mobile electronic device such as a cellular telephone or handheld computing device. In other embodiments, digital images may be taken and submitted via a publically accessible kiosk (e.g., located on the street or in a convenience store). In still other embodiments, digital images may be submitted via a computer using an internet connection (e.g., regardless of whether such images are taken by a camera resident in or connected to such a computer or are uploaded to a computer via a conventional camera or scanning device). In further embodiments, images may be obtained from third party sources or originally authored such as via software.

In certain example embodiments which should be construed as non-limiting, payment for lottery participation may be submitted via use of a prepaid SIM card. Other mechanisms for payment include, but are not limited to, personalized payment accounts such as merchant accounts or PAYPAL type accounts (or other proprietary account types) or credit card payments (where legal) such as via the internet. Other payment methods may, of course, be used. Care should be taken, of course, to comply with local laws pertaining to the legality of acceptable payment types for lottery ticket purchases or other lottery participation type. Payments may be made on a per ticket basis at the time of lottery ticket purchase or submission or at other times as may be contemplated by those of skill in the art (and may be made in association with single, multiple ticket or batch ticket purchases, for example). In certain (but not all) embodiments, it is preferred that payment be completed before or with ticket purchase or digital image submission.

In certain (but not all) embodiments of the invention, it is an object to provide a more instant gaming experience to the lottery participant. For example, in such embodiments, the time span between the actual purchase of the ticket and the draw can be shortened dramatically, and theoretically down to one hour, as opposed to traditional lotteries that operate with a "waiting period" of up to a week.

In the same or alternative (but not all) embodiments, lottery tickets are personalized (e.g., via use of submitted images) and therefore provide a more engaging experience for the lottery participants (e.g., which may encourage participation or loyalty with the lottery). In certain exemplary embodiments, the winning tickets and/or tickets which advance to intermediate stages (prior to the final stage of the lottery) will be shown on television or displayed in some other public format (e.g., such as on the internet). Moreover, in some embodiments, the image that becomes representative of the lottery ticket (e.g., and which is displayed on television) is an image that displays what the ticketholder or participant chooses (for instance a personal or family or pet photo).

In the same or other (but not necessarily all) embodiments, the inventions described herein can be utilized while mitigating gambling related social issues. For example, certain of the technologies described herein enable the lottery provider or administrator to monitor the revenue generated by each individual participant or ticketholder (e.g., by monitoring the frequency or quantity of ticket purchases). This allows entities to consequently regulate the individuals gaming habits to, for example, prevent excessive gambling. In such embodiments, the lottery provider or administrator can, for example, maintain a profitable business and generate revenue for its charities, governments, and beneficiaries, etc. while avoiding significantly contributing to the social issues of gambling addiction.

Similarly, certain (but not all) of the technologies described herein can aid in compliance with and enforcement of laws and other governmental regulations (or even contractual obligations) related to lotteries. For example, because of the electronic nature of the lottery tickets described herein, regulatory entities (e.g., governments) can prevent excessive ticket sales utilizing computerized control. For example, such controls can be used to prevent more tickets from being sold or issued than the operator is permitted or for which the provider or administrator is otherwise licensed. Still further, certain (but not all) of the embodiments of the technologies described herein provide for increased ability to evaluate and/or analyze lottery transactions. For example, such embodiments may provide entities (e.g., governmental authorities) with an increased ability to investigate or evaluate suspicious transactions and/or trace transaction origins, thereby allowing for possible prevention of illegal activity such as money laundering.

Certain examples of the invention are now described below with respect to certain non-limiting embodiments thereof as illustrated in the following drawings wherein:

DETAILED DESCRIPTION OF CERTAIN EMBODIMENTS

For a more complete understanding of the present invention, reference is now made to the following description of various illustrative and non-limiting embodiments thereof, taken in conjunction with the accompanying drawings in which like reference numbers indicate like features.

Addressing one or more of the above-described drawbacks or needs in the lottery arts (or other drawbacks or needs not specifically described herein), at least one embodiment of the subject invention comprises a unique lottery ticket comprised of a photograph or other digital image submitted by a contestant in combination with payment for lottery participation. Such an image and/or payment information is compiled and/or encrypted to form a secure information capsule which serves as a lottery ticket. When such a capsule is encrypted, the information contained in the lottery ticket (including the identity of the contestant, the image, and possibly other information) is secured from unauthorized access and therefore aids in preventing tampering with lottery integrity. Because numerous other types of information may be provided in connection with a digital image (e.g., at the time of purchase of lottery participation), such as a contestant's name, address, phone number, sex, birth date, date/time of ticket purchase, etc., such categories of information, including payment information, are periodically referred to herein as, and are intended within the scope of this document to be, synonymous with the term "contestant information".

Figure 1:
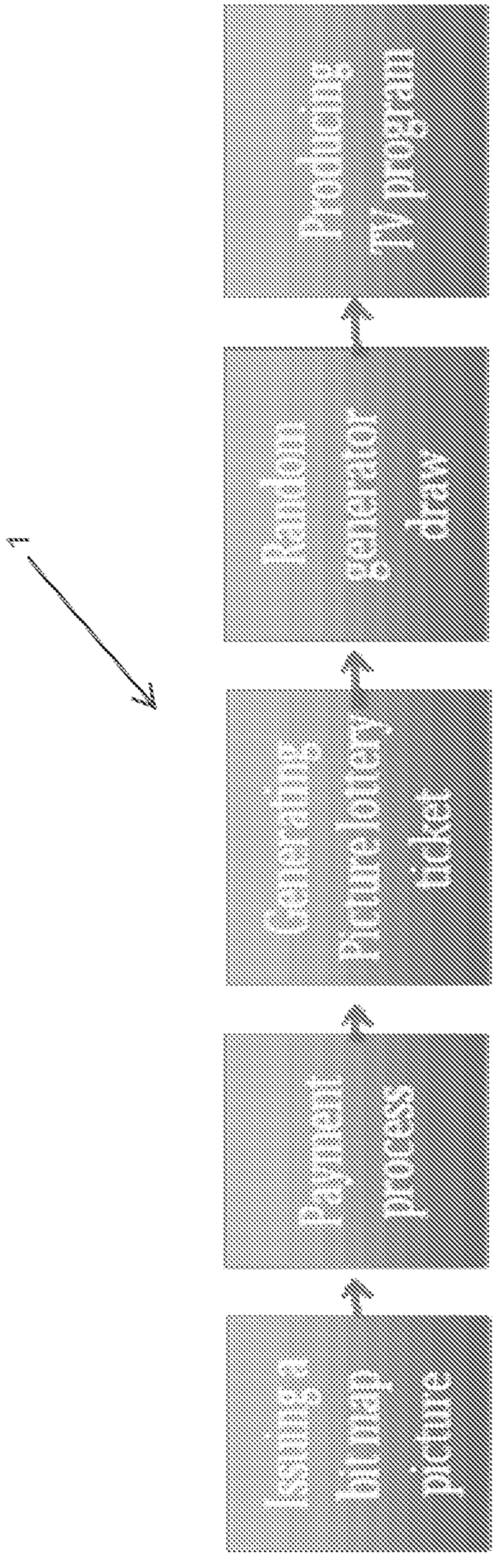
FIG. 1 schematically illustrates one embodiment of an example lottery system according to the subject invention.

Referring now to FIG. 1, a non-limiting, example embodiment of a lottery system which utilizes such a lottery ticket (e.g., comprised of a digital image and contestant information compiled or encrypted to form an information capsule) is schematically depicted therein. Generally speaking, such a lottery system 1 includes five main stages or phases which begin with entry of a contestant into the lottery and terminate with the selection of a lottery winner and the broadcast or publication of such lottery winner on a television program, webcast, website, or the like.

More specifically, the lottery begins with phase 1 where the prospective lottery contestant submits a digital image to the lottery provider. Such digital image may be taken or captured using a cellular phone (with a built-in camera) or may be taken with a conventional camera and then uploaded to a computer or cellular phone for submission. Similarly, a scanner may be used to create a digital image or an image may simply be obtained from third party sources or even authored via software programs such as Adobe Acrobat, Photoshop, or Microsoft's Paint application. In still another example, lottery kiosks may be provided in public locations, such as grocery or convenience stores, with such kiosks including cameras and appropriate data or internet connections for capturing and submitting digital images. Regardless of how the image is created or captured (and regardless of the type of image file which is employed, for example, a ".bmp" or ".jpg" or ".tiff" type file), the image is ultimately submitted to the lottery provider or administrator using suitable methods or mechanisms. These may include, but are not limited to, via MMS message, internet (e.g., via email), proprietary software interface (e.g., contained or downloaded onto a computer, hand held device, or mobile phone), or via the above-described kiosk, for example. In at least one embodiment (not intended to be limiting to the invention), once an image is submitted to the lottery provider, the image is stored on lottery servers in association with a unique user profile linked or associated with the lottery contestant (e.g., created simultaneous with, prior to, or after the submission of a suitable image).

In phase 2, subsequent or simultaneous with phase 1 (or even prior thereto), a lottery contestant submits payment for lottery participation (e.g., payment for entry into the lottery, issuance of the ticket, and the chance at winning prizes or money). Such payment can be completed using functionalities or services offered by contestants' mobile operators where the owners of the mobile phones (or cellular phones) are charged or billed through their mobile subscription either as a credit, debit, or via deduction from a pre-paid account (e.g., a pre-paid SIM card). This billing or debiting (or at least the recording of the transaction) may occur simultaneous with an MMS image submission to the lottery operator, for example. In other example embodiments, user profiles may be linked to payment services or options such as merchant accounts, credit or debit cards, or PAYPAL type accounts (e.g., such that when an image is submitted to the lottery administrator, payment is automatically completed via payment services linked to the user profile). However payment is made, in exemplary embodiments of the invention, whenever an image is submitted to the lottery provider (or when the lottery provider processes or accepts a submitted image), a valid payment is registered and a lottery ticket purchase (or lottery entry) is fulfilled. Thereafter, in phase 3, the process of creating a picture or image type lottery ticket is begun.

Figure 2:
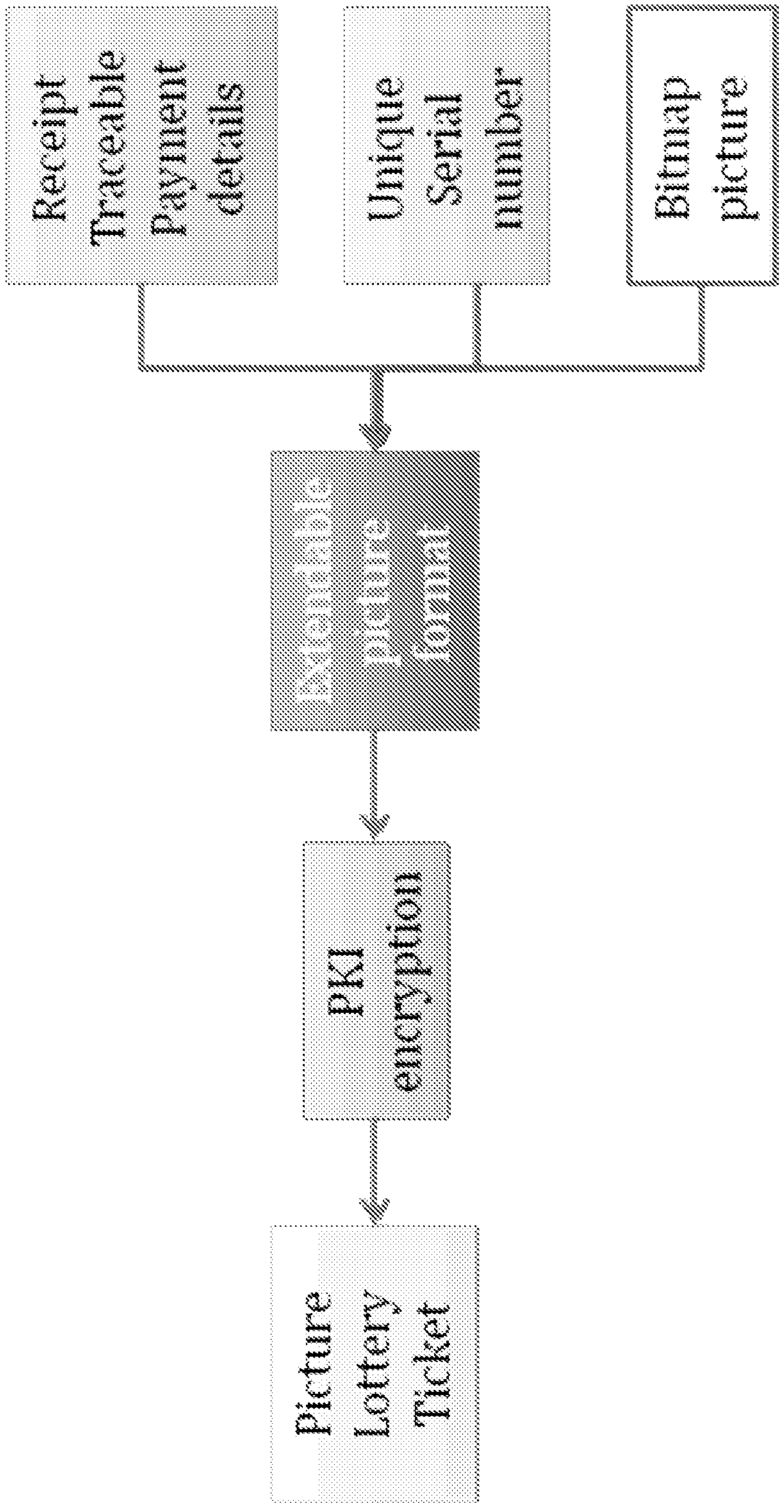
FIG. 2 schematically illustrates one method or process of creating or generating lottery tickets according to one non-limiting embodiment of the subject invention.

In particular, during phase 3, the image file submitted by the lottery contestant is converted into a lottery ticket, as schematically illustrated in FIG. 2, which, optionally, can be used in an existing or conventional lottery process and infrastructure. This conversion, in preferred (but not necessarily all) embodiments, includes a combination or compilation of the digital image with contestant information, which preferably includes payment information, as defined herein above. Generally speaking, each lottery ticket (e.g., created from a digital image, etc.) converted or created results in a self-contained information capsule (e.g., created or stored as a ".lot" file with associated MIME type(s) to process the file), which, in preferred embodiments, carries all (or at least some) information necessary to secure lottery ticket integrity and to re-generate the originally submitted lottery picture or image (and/or contestant information). Further, in at least some embodiments, each information capsule or lottery ticket created will be linked to the users (i.e., image issuer's or lottery contestant's) unique personal profile.

In certain embodiments, when a picture or image is received from an issuer (i.e., a lottery contestant), the lottery provider or administrator charges a fee to convert the image into a lottery ticket. In preferred embodiments, traceable banking information—for example routing numbers or information and/or clearing house numbers—will be integrated in whole or in part into the lottery ticket.

Also (in at least some embodiments) during phase 3, to ensure, among other things, that each lottery ticket has a unique value or identifier, a serial number will be generated and integrated into or associated with the lottery ticket. Such a serial number may be generated randomly or as a result of data provided by the lottery contestant (e.g., derived from digital image information and/or contestant information).

In certain embodiments of the invention (but not necessarily all embodiments), open source extendable image formats are used for compressing or packing information, but in some cases, non-open source (for example, proprietary) formats will be used. In embodiments in which non-open source or proprietary formats are used, such use may be employed for the purpose of further uniquely identifying images or generated lottery tickets. Such use, in this regard, may provide security or integrity to the lottery system or method by indicating the presence of or by providing necessary lottery information. Although conventional PKI type encryption may be used to encrypt information capsules and/or tickets and/or contestant information (e.g., so that the tickets or information capsules, etc. can only be opened or accessed by authorized persons to thereby provide additional integrity or security to the lottery system), it is contemplated, of course, that other encryption types or methods may be used (or that other data securitization types or methods, exclusive of encryption, may be used) regardless of whether in existence at the time of the present application for patent.

Of course, each of these steps or processes just described related to encryption, compilation of data, and/or otherwise related to the creation of the information capsule or lottery ticket (whether or not encrypted at this stage or later or not at all) may be performed by the lottery contestant rather than the entity administering the lottery (or such entity's equipment or agent), or by some combination thereof. For example, software may be provided either preloaded into computers or mobile devices or made available as downloads (e.g., as an iPhone software application). Such software could be used by a lottery contestant to pre-encrypt image and contestant information or to otherwise create a valid, secure lottery ticket (e.g., or information capsule) prior to or simultaneous with submission of such to the entity administering the lottery (whether or not such lottery ticket or information capsule is encrypted, by compiling or combining appropriate data or information).

In phase 4 or the lottery draw phase, a lottery drawing will take place in which lottery entrants will either be selected to advance to intermediate or advancement phases of the lottery and/or a final lottery winner or winners will be selected. In certain example (but non-limiting) embodiments, a lottery draw is conducted utilizing an approved (and preferably secure) random number generator and/or lottery draw machine supplied by one of a number of possible vendors.

In certain but not all embodiments, the draw is completed in several rounds such as "qualification", "advancement", and "final" rounds. In an example of one of such embodiments, a first round is completed or performed to select a plurality of lottery tickets which, as winners of an initial lottery stage (or "qualification draw"), enter or proceed to the next levels or stages of the lottery. In such later stages, further draws are completed which select or determine winners to proceed to additional or a final stage(s). As described in more detail below, one or more (or all) of such draws or levels (e.g., including pictures or images of the contestants advancing) can be broadcast (or integrated into an existing broadcast) on a television program or otherwise publicized such as on a webcast or website. Further, the various levels of draw may be completed or initiated prior to a television broadcast (for example) or, alternatively, as a live component of a television program (e.g., using pre-moderated images or photographs from or comprising the lottery tickets).

In some embodiments of the inventive lottery methods and/or systems where moderation of images or photographs is employed (e.g., because of local laws regulations or ethical standards), the approval or moderation process is conducted by human moderators. More particularly, such moderators will review and adjudge the submitted, selected, or drawn pictures or images to ensure compliance to regulatory and decency issues (i.e., which will typically be different from market to market and from application to application). If a picture is not compliant or is otherwise not acceptable (e.g., as decided by moderators or other mechanism), it can be exchanged or replaced with a dummy placeholder picture or other generic image for use in the associated television program or other form of lottery publication or broadcast.

Figure 3:
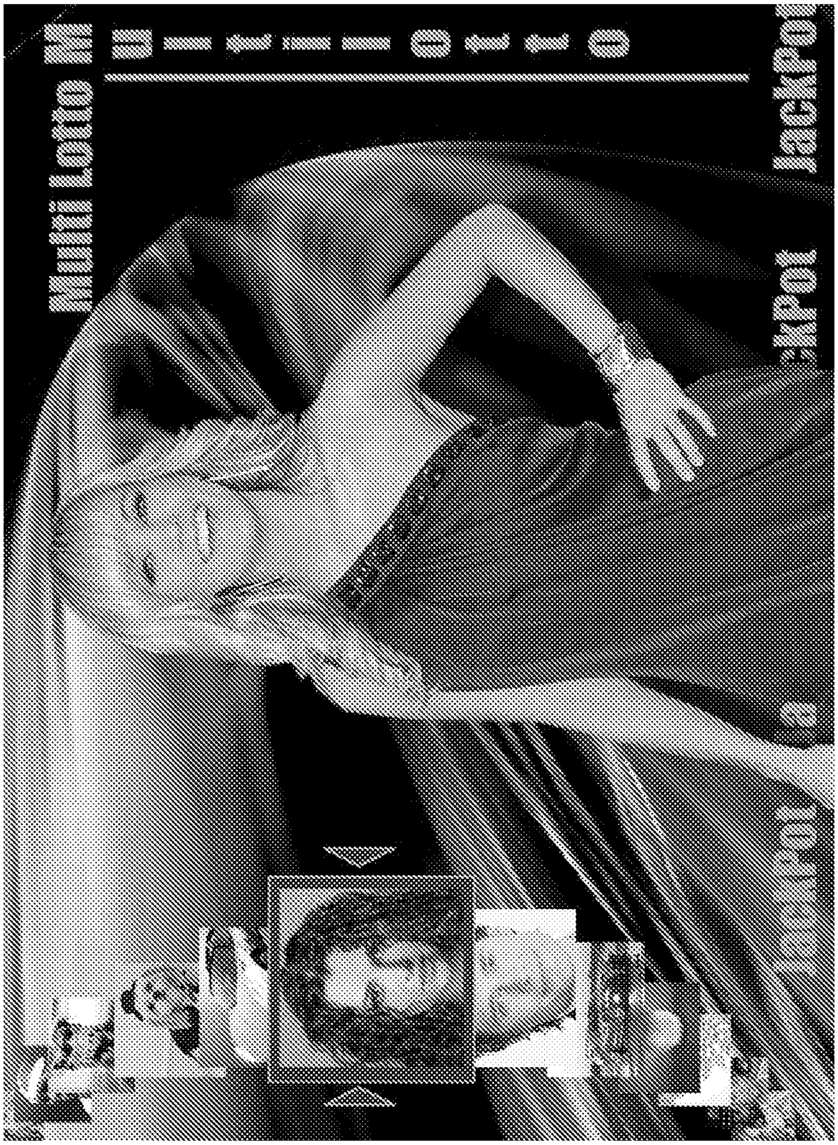
FIG. 3 illustrates an example screenshot of a television program or web production of a broadcast or publicized lottery according to one embodiment of the subject invention.

As contemplated by the Applicant herein, at least one purpose of the television broadcast or other type broadcast or publication of the subject lotteries is to provide a visual, more engaging component to the herein described lottery systems and methods. In this regard, by broadcasting or publicizing images or photographs submitted by lottery contestants (see FIG. 3, for example), participation in such lotteries and/or viewership of such lotteries is expected to improve (e.g., because of the prospect of viewing a neighbor's or friend's or one's own submitted image or photograph) thereby bringing additional revenue to such lotteries. Although such goal is believed to be best accomplished by broadcasting or publicizing (visually) multiple levels or stages of the herein described lotteries, it is, of course, contemplated that no stages or only one stage of such lotteries are publicized or broadcast (with the photograph or image information otherwise providing additional verification of the identity of the lottery contestant, among other benefits, for example).

In addition to the other benefits and advantages of the lottery tickets, methods, and systems described herein, it is noted that by utilizing an electronic contestant entry procedure and/or process and/or ticket, in certain embodiments, new lotteries can be organized and/or initiated in short periods of time. Moreover, previously organized or initiated lotteries can be completed in condensed time frames. For example, in certain embodiments, new lotteries can be announced to prospective contestants via television commercials, web broadcasts, SMS texts, or MMS messages, and the lotteries can be completed quickly or within some compressed time frame thereafter. For example, prospective participants generally interested in lotteries could subscribe to notification services which will send SMS or MMS messages (or emails) to such subscribers announcing the creation or initiation of new lotteries. Utilizing the technologies including tickets, methods, and systems described herein, such announced or initiated lotteries could be joined or entered virtually instantaneously (e.g., without requiring a trip to a remote lottery ticket purchase center) such as by return MMS message or email message (e.g., with included image and/or payment information as described herein above).

Example (Non-Limiting) Steps in One Method or System of Administering an Embodiment of the Herein Described Lotteries:

I. Registering the customer
1. In certain embodiments, for a customer to enter the lottery, the customer may provide or register one or more of the following details:
   - Name
   - Phone number
   - E-mail
   - Address
   - Birth date or age Of course, in some embodiments, only some of the example identifying detail listed above may be provided. For example, a phone number and name may be the only information given and may be collected by way of receipt of an SMS or other message from the lottery participant.

2. Terms of use may be presented or displayed and may be required to be accepted by the customer prior to issuance or acceptance of lottery ticket.
3. Information registered in the database may be encrypted.

II. Taking the picture
1. The customer takes a digital picture utilizing a camera-phone or ordinary digital camera.

—or—

2. The customer scans an ordinary photo or image and uploads the photo or image to his/her phone or computer.

—or—

3. The customer uses an existing digital image created by the customer or any third party or other source.

—or—

4. The customer utilizes a publicly available lottery kiosk to create a digital image.

III. Sending the digital image or picture
1. The digital image is sent to the lottery server by using a mobile phone, tablet, or similar device's MMS utility.

—or—

2. The digital image is sent to the lottery server by e-mail or instant message ("IM") or via an internet chat service or via satellite connection (for instance from a mobile phone or electronic tablet) or by similar electronic mechanism or means.

—or—

3. The digital image is sent to the lottery server using a lottery kiosk.

IV. Paying

1. The customer pays in advance by way of an existing, conventional payment and debit solution for mobile phones.

—or—

2. The customer has the cost of the lottery ticket and the cost of the data transfer added to the customer's phone bill.

—or—

3. The customer has the cost of the lottery ticket (e.g., and possibly the cost of the data transfer) deducted from his or her pre-paid mobile phone card (e.g., instantly).

—or—

4. The customer pays via the internet by way of bank transfer.

—or—

5. The customer pays via the internet by way of debit card or credit card.

—or—

6. The customer pre-pays the lottery ticket in a kiosk.

V. Receiving payment

1. When payment is received by way of an existing payment and debit solution for mobile phones, the payment and its amount may be encrypted (but is not required to be) and then registered and linked to the customer's profile in the database.

—or—

2. When payment is received or confirmed by the customer's mobile phone carrier by way of deduction from the customers pre-paid mobile phone card, the payment and its amount may be encrypted and/or registered and linked to the customer's profile in the database.

—or—

3. When payment via internet is confirmed by a credible or trusted third party (i.e., a bank, credit card merchant, PAYPAL, etc.), the payment (optionally) may be encrypted and/or then registered and linked to the customer's profile in the data base.

—or—

4. When payment is received or confirmed by the customer's mobile phone carrier by adding the cost to the customer's phone bill, the payment and its amount may (optionally) be encrypted and/or then registered and linked to the customer's profile in the database.

VI. Receiving the image

1. Upon receipt of an image at the lottery server (or at a later time prior to broadcast or publication, for example), the image may be manually checked in order to make sure it complies with laws and/or general ethical standards.

2. If an image is, for some reason, not in compliance with current laws or ethical standards (e.g., because it is obscene, insulting in nature, etc.), the image may be replaced with a standard, computer generated image.

VII. Sending receipt

1. The customer may be sent a receipt by SMS text to the number registered in the database, and/or the number the image was sent from, as a confirmation of the transaction.

—or—

2. The customer may be sent an MMS message as a receipt and confirmation of the transaction.

—and/or—

3. If the image submitted for processing as a lottery entry was deemed unfit for any reason (e.g., unlawful for public broadcast), the customer may be notified by way of SMS or MMS or other mechanism.

VIII. Registering the picture, creating the lottery ticket

1. Upon receipt of an image at the lottery server (or, in other embodiments, prior to submitting the image to the lottery administrator), the image may be encrypted.

2. The encrypted image is linked to the payment, the amount and origin of the payment (and possibly other contestant information, if desired) and may be assigned and linked to a unique sequence number. The encrypted image serves as the actual lottery ticket.

3. The lottery ticket created in step 2 above is linked to the customer's profile.

4. The received image is combined with contestant information, payment details, and a unique sequence number and is encrypted to form an information capsule which serves as an actual lottery ticket.

—or—

5. The received image is combined with contestant information, payment details, and a unique sequence number which serves as an actual lottery ticket (i.e., without performing an encryption step or forming an information capsule).

IX. The draw

1. A random number generator generates a unique random number for every participant's customer profile. Alternatively, a unique number is assigned to each lottery ticket at an earlier time or during an earlier step such as when the image and payment are registered as a lottery ticket.

2. In an intermediate or lottery advancement (or final winner) stage, depending on the number of participants, the random number generator generates one or more numbers.

3. The numbers generated or "drawn" in step 2 are matched to lottery tickets generated or validated in earlier steps by matching such drawn numbers to the numbers assigned or affiliated with such lottery tickets in previous steps. The customers (or customer profiles) associated with such matches are deemed winners (e.g., final or advancement stage winners).

—or—

4. Steps 2 and 3 can be repeated until the lottery provider (or operator) has a fitting or desired number of participants or images for the final winner draw (e.g., for display on the internet or for broadcast on television).

5. Optionally, images can be screened by moderators at this stage in addition to or instead of at earlier stages when or if there are large numbers of lottery participants.

X. The show

1. The television show or webcast or website will display images that represent entrants to the lottery.

2. One or more winners will be drawn by a random number generator.

3. The final winner (or intermediate stage winners) will be shown on a television show or webcast or website (or other desired public medium).

4. If the lottery ticket image was an MMS sent by mobile phone, the participant may be called on the phone number it was sent from, if no preferred alternate number was provided (or may be contacted by other mechanism or means).

5. The show (or webcast or internet display) may be broadcast or published as pre-recorded, with delay, or live.

XI. The confirmation of winnings

1. As an optional service, informal confirmation of winnings may be given by SMS, e-mail or MMS.
2. Binding confirmation of winnings is given in writing.

XII. Other functions and applications

1. In order to prevent unhealthy and compulsive gambling habits from emerging, a database can be utilized to automatically separate and track the gaming patterns of separate individuals.

—and/or—

2. If an unhealthy gambling pattern emerges, measures can be taken to prevent negative effects, such as by providing SMS, MMS or email warnings and advice to lottery entrants as well as by instituting restrictions for individual lottery participants. Moreover, restrictions and changes can be made to the lottery game itself. The lottery provider or operator may also, optionally, exclude individuals entirely.

—and/or—

3. A database or other utility may be utilized, created in association with the operation of the lottery, so that the lottery game automatically enforces age limits or other terms or conditions of the specific lottery game itself (which may be changed from game to game or country to country or state to state, for example).

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined.

We claim:

1. A lottery system comprising:

a) a lottery contestant generating a digital image utilizing a camera, a cellular phone with a built-in camera, a scanner, or a kiosk and electronically submitting said digital image to a lottery provider for lottery participation utilizing an MMS message or an internet connection, said digital image being stored on lottery servers, and said digital image comprising at least one still image selected from a personal photograph, a family photograph, and a pet photograph; said lottery contestant also submitting payment to said lottery provider for lottery participation utilizing mobile billing, a merchant account, a debit or credit card account, or an account deduction from a pre-paid account;

b) electronically encrypting said digital image and contestant information, utilizing software provided on said lottery contestant's computer or mobile device or upon receipt of said digital image by a server of said lottery provider, to form an information capsule comprising an lottery ticket;

c) generating a random entry number utilizing a random number generator, said random entry number being derived from digital image information obtained from said digital image, and affiliating said random entry number with said lottery ticket;

d) repeating steps a), b), and c) such that a plurality of lottery tickets are formed and a plurality of random entry numbers are generated and affiliated with said plurality of lottery tickets;

e) randomly selecting a random winner number in a winner selection phase and matching said random winner number with one of said plurality of random entry numbers to thereby determine a winning ticket of said lottery; and f) decrypting said information capsule comprising said winning lottery ticket and obtaining information about the lottery contestant which submitted said winning ticket from said decrypted information capsule.

2. The lottery system according to claim 1 further including the step of:

integrating said lottery into one of the group consisting of: a television show, web broadcast, website, mobile device broadcast, or software generated graphical user interface.

3. The lottery system according to claim 2 further including the steps of:

prior to the step of randomly selecting a random winner number in said winner selection phase and matching said random winner number to determine a winning ticket, selecting a subset number of said plurality of lottery tickets which is less than the total number of said plurality of lottery tickets and designating said subset number of selected lottery tickets as winners of an intermediate stage of said lottery.

4. The lottery system according to claim 3 further including the steps of:

at said intermediate stage, displaying said digital images of intermediate stage winners on said television show, web broadcast, website, mobile device broadcast, or software generated graphical user interface; and when a final, single winning ticket is selected, displaying said digital image submitted by the winning contestant on said television show, web broadcast, website, mobile device broadcast, or software generated graphical user interface.

5. The lottery system according to claim 4 further including a moderation step in which moderators review digital images submitted for processing as lottery tickets and approve or disapprove images for broadcast or publication.

6. The lottery system according to claim 5 wherein during said moderation step, if a said digital image is disapproved, an alternate image is substituted for the disapproved image and is assigned to the lottery ticket associated with said disapproved image and said alternate image is utilized for broadcast or publication.

7. The lottery system according to claim 4 further including the step of logging each said random entry number, affiliated with each said lottery ticket which form said plurality of lottery tickets, for use in performing the intermediate stage winner selection or winner selection steps.

8. The lottery system according to claim 7 wherein said intermediate stage winner selection or winner selection steps are performed utilizing a random number generator to randomly generate numbers which are matched to said plurality of random entry numbers generated in association with said plurality of lottery tickets to thereby select intermediate stage winners and/or a final lottery winner.

9. The lottery system according to claim 1 further including the steps of:

prior to the step of randomly selecting a random winner number in said winner selection phase and matching said random winner number to determine a winning ticket, selecting a subset number of said plurality of lottery tickets which is less than the total number of said plurality of lottery tickets and designating said subset number of selected lottery tickets as winners of an intermediate stage of said lottery.

10. A lottery system according to claim 1, further wherein:

lottery participation is solicited by a lottery provider via invitations communicated via web broadcast, television announcement, SMS message, MMS message, or electronic mail; and wherein because lottery entry is accomplished electronically by submitting said digital image via said MMS message or said internet connection, new lotteries can be initiated and completed in compressed time periods.

* * * * *